(12) United States Patent
Burcik (10) Patent No.: US 7,365,445 B2
(45) Date of Patent: Apr. 29, 2008

(54) APPARATUS FOR CONVERTING OCEAN WAVE ENERGY TO ELECTRICAL ENERGY

(76) Inventor: Frank Burcik, 2010 Bell Ct., Lakewood, CO (US) 80215

(*) Notice: Subject to any disclaimer, the term of this patent is extended or adjusted under 35 U.S.C. 154(b) by 0 days.

(21) Appl. No.: 11/701,266

(22) Filed: Feb. 1, 2007

(65) Prior Publication Data

US 2007/0290508 A1    Dec. 20, 2007

Related U.S. Application Data (60) Provisional application No. 60/784,555, filed on Mar. 21, 2006.

(51) Int. Cl.
F03B 13/10    (2006.01)

(52) U.S. Cl. .......................... 290/53; 290/42; 290/43; 290/54

(58) Field of Classification Search ................. 290/53, 290/42, 43, 54
See application file for complete search history.

(56) References Cited

U.S. PATENT DOCUMENTS

| | | | |
|---|---|---|---|
| 4,123,185 A * | 10/1978 | Hagen et al. ................. 405/76 |
| 4,267,695 A * | 5/1981 | Micciche ..................... 60/473 |
| 4,345,434 A | 8/1982 | Nedyalkov | |
| 4,672,222 A | 6/1987 | Ames | |
| 4,718,231 A | 1/1988 | Vides | |
| 4,720,976 A * | 1/1988 | Kim et al. .................... 60/495 |
| 4,781,023 A | 11/1988 | Gordon | |
| 5,105,094 A | 4/1992 | Parker | |
| 5,311,064 A | 5/1994 | Kumbatovic | |
| 5,359,229 A | 10/1994 | Youngblood | |
| 5,789,826 A | 8/1998 | Kumbatovic | |
| 6,133,644 A | 10/2000 | Smith et al. | |
| 6,247,308 B1 | 6/2001 | Solell | |
| 6,647,716 B2 | 11/2003 | Boyd | |
| 6,700,217 B1 | 3/2004 | North et al. | |
| 6,711,897 B2 | 3/2004 | Lee | |
| 6,781,253 B2 | 8/2004 | Newman | |
| 6,933,624 B2 * | 8/2005 | Beaston ....................... 290/43 |
| 6,956,300 B2 | 10/2005 | Gizara | |

* cited by examiner

Primary Examiner—Darren Schuberg
Assistant Examiner—Iraj A. Mohandesi
(74) Attorney, Agent, or Firm—Craig Barber; Barber Legal (57) ABSTRACT

A wave motion generator having a bore hole at a coastline of an ocean. The bore hole lower end communicates with the ocean underwater while the upper end is above water level, allowing wave motion within the bore hole. A float disposed within the bore hole may travel along the borehole between at least two positions. A linkage attached to the float converts the motion of the float to rotary motion of a generator shaft so as to induce electric current in the generator. The linkage may be pneumatic, in which the float motion induces pressurized air to drive a turbine, or it may be a chain drive, a shaft drive, etc.

14 Claims, 11 Drawing Sheets

APPARATUS FOR CONVERTING OCEAN WAVE ENERGY TO ELECTRICAL ENERGY

CROSS-REFERENCE TO RELATED APPLICATIONS

The application claims the priority and benefit of now abandoned U.S. Provisional Patent Application No. 60/784,555 filed Mar. 21, 2006 in the name of the same inventor, Frank Burcik and also entitled APPARATUS FOR CONVERTING OCEAN WAVE ENERGY TO ELECTRICAL ENERGY, the entire disclosure of which in incorporated herein by this reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

FIELD OF THE INVENTION

This invention relates generally to wave energy and specifically to bore/float systems of generating energy from wave motion.

STATEMENT REGARDING FEDERALLY FUNDED RESEARCH

This invention was not made under contract with an agency of the US Government, nor by any agency of the US Government.

BACKGROUND OF THE INVENTION

The enormous power of ocean waves has been known for millennia. In recent decades, as global demand for energy has increased and energy supplies have suffered bottlenecks, interest has grown in harnessing that power and converting it into usable energy.

Ocean wave energy is close to free after initial capital costs are paid, making it an excellent candidate for low-cost power generation. Unlike photovoltaic cells which normally wear out and require complete replacement within a decade or two, the mechanical equipment of an ocean wave energy generator can be made to have an extremely long life span, as mechanical equipment of this type can be made to last for many millions of cycle of use. Unlike fossil fuels, no fuel source is burned once: no fuel is needed at all.

Figure 10:
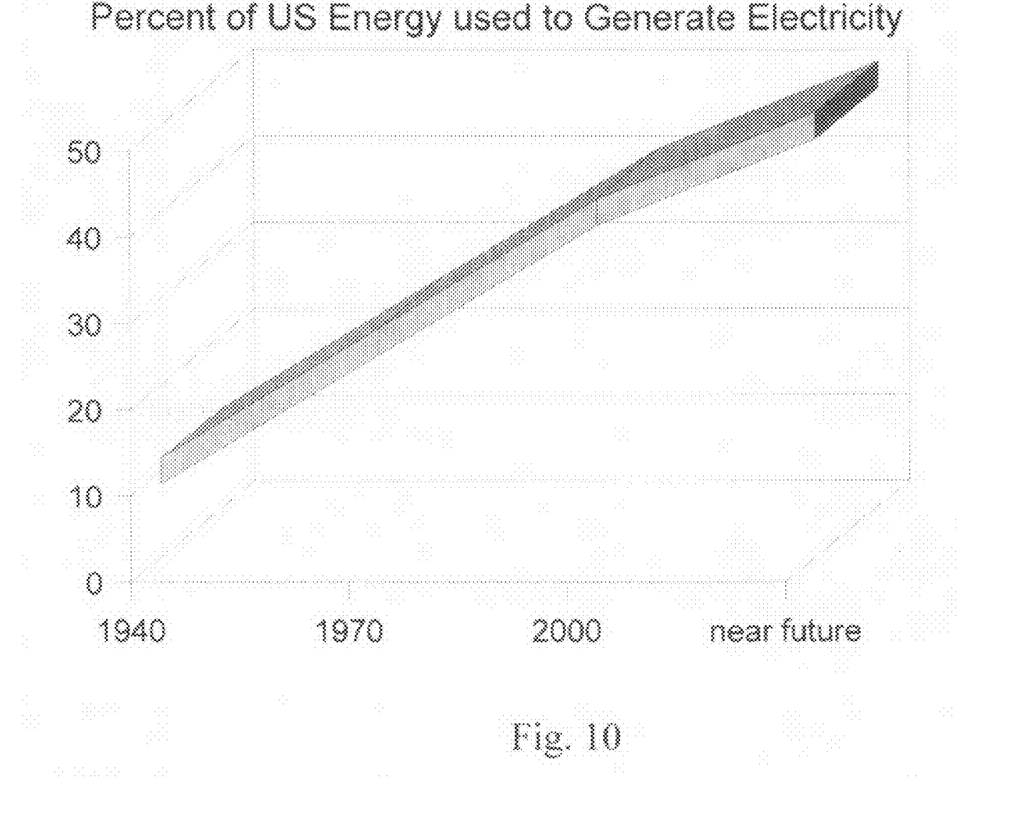
FIG. 10 is a rough chart of the percentage of energy generation used to make electricity in the United States over the last two generations and estimated growth for several years into the near future.

The amount of electrical energy required is persistently increasing across time. According to Roger Kranenburg (energy executive), the US share of energy used to generate electrical energy has increased four fold in two generations, as shown in FIG. 10. In 1940, only 10% of US energy consumption was electricity, but by 1970, this figure had more than doubled, and it continues to double to approximately 40% by the present time, with no sign of leveling off. This pattern is repeated in developing nations such as the nations of Central America. Obviously, acquisition of energy generation capacity which has only capital costs and almost no maintenance costs and no fuel costs whatsoever would be every advantageous.

Figure 8:
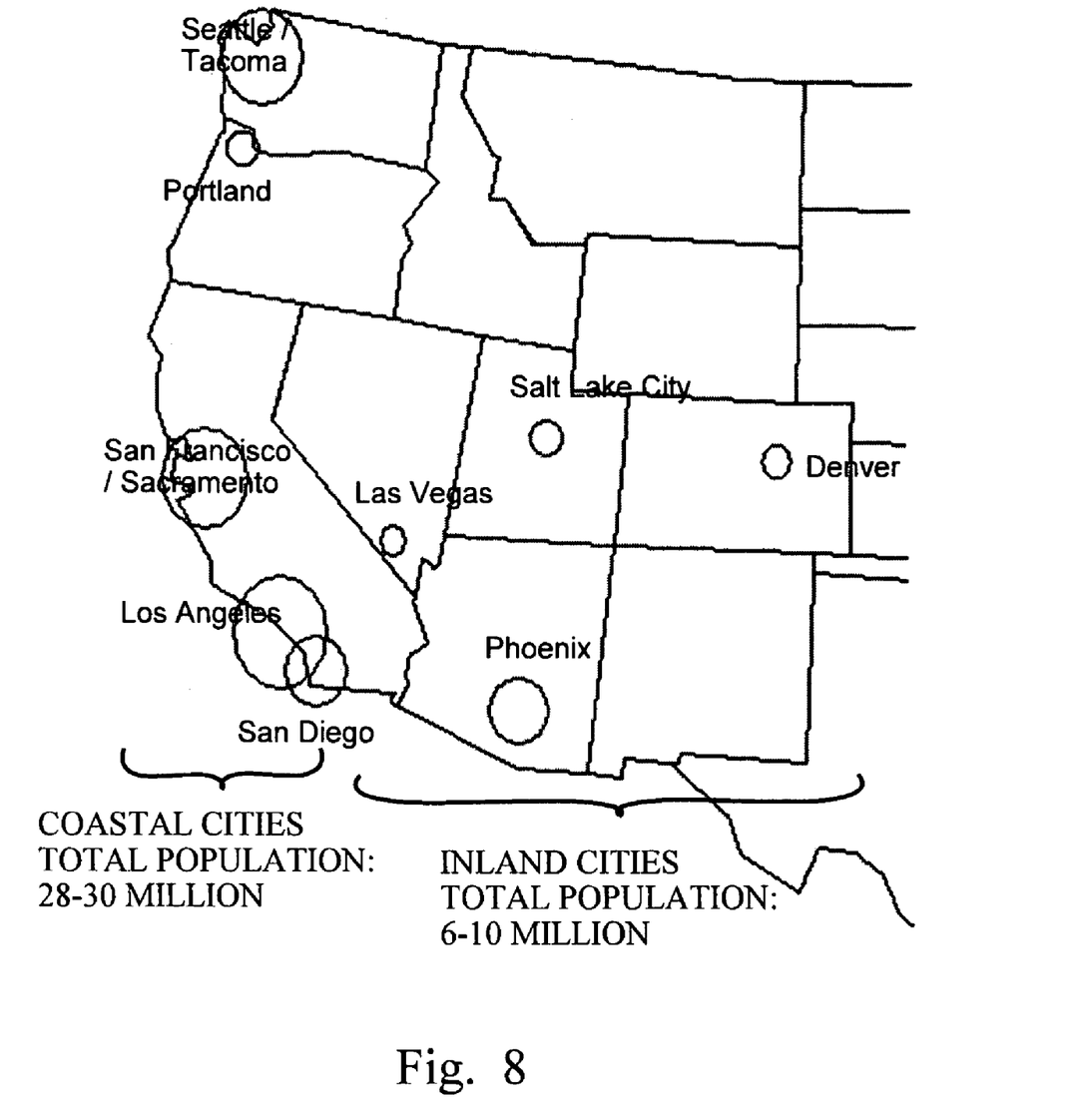
FIG. 8 is a diagrammatic map showing major population centers of the Western United States of America.
Figure 9:
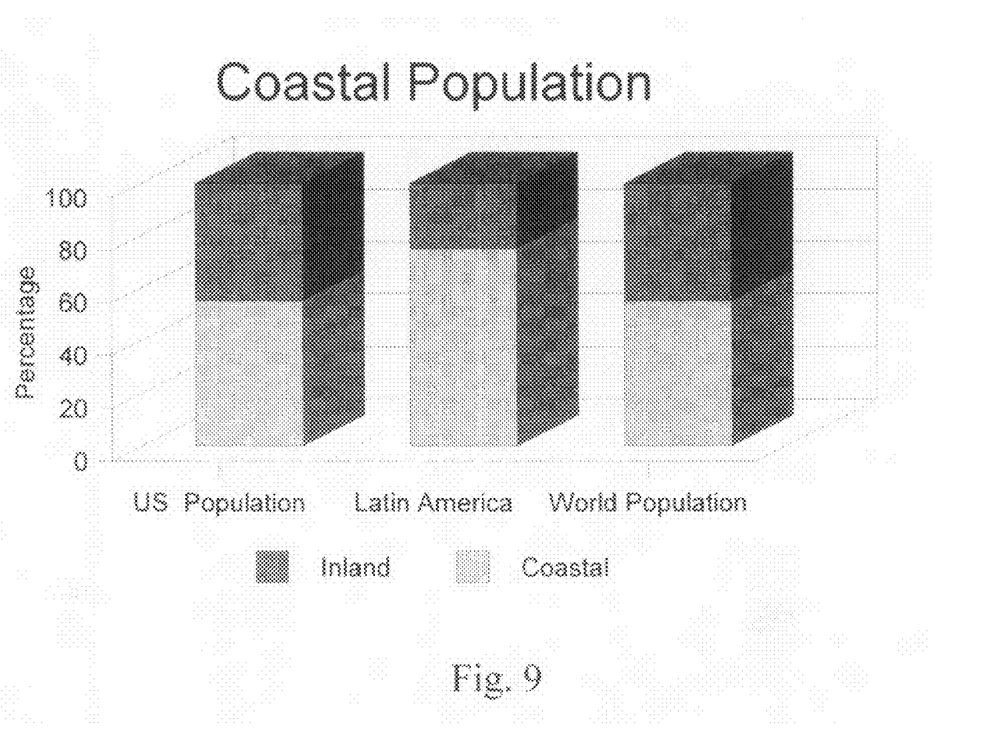
FIG. 9 is a chart showing percentage of population living along a coast-line, with bars for the sum of the world population, the population of the United States of America, and the population of Latin America and the Caribbean Region.

Wave energy has another advantage. Most of the Earth's population lives quite close to an ocean. Over two thirds of the human population lives within 400 kilometers of a coast, in fact, over one half live within 200 kilometers (~120 miles) of a coast. This distance is well within the practical distance for electricity transmission (electricity generation over long distances still suffers from some problems to this day). This statistical trend holds true for every one of the populated continents except Africa, and even in Africa demographic changes are causing the population to trend towards the coasts. The result is that over one half of the world's population lives on only 10% of the land area of the planet (roughly 3% of the total area of the planet), and that tiny percentage is the strip of land by the ocean. FIG. 9 shows the overall distribution of population of the world, the United States, and Latin America. It is worth noting that Latin America is an extremely good candidate for ocean wave energy as Latin America has fully three quarters of the population of the region living on a coast. FIG. 8 is more relevant to the United States, and shows the major population concentrations of the western half of the nation. Four inland cities have a combined population of approximately 10 million or less while five major urban areas (often composed of more than one major city each) have a combined population roughly three times as great: approximately 30 million people. The three largest western US urban areas are on the West Coast, along with the several "smaller" major cities. Yet informal surveys by the applicant reveal excellent spots for ocean wave generation facilities of the type taught by the invention are available even in the middle of the these heavily built up urban areas. A number of schemes have been proposed for generating energy from waves. Almost invariably, these schemes seek to provide large and complex structures in the tidal zone of the ocean, presumably at great cost and effort. However, the locations most in need of wave energy generation facilities are not normally wealthy. In addition, the requirements for complex mechanisms require that the equipment be imported from distant locations at further expense. Worse, the necessity to import expensive equipment may make such installations impossible for regions which have unfavorable balances of trade. A search in the collection of patents of the United States reveals a number of examples of these schemes.

U.S. Pat. No. 6,956,300 issued Oct. 18, 2005 to Gizara is typical: it envisions placing a railroad track on the floor of the body of water, then placing a gimbal-mounted hydroelectric generator on a carriage running on the tracks.

U.S. Pat. No. 6,781,253 issued Aug. 24, 2004 to Newman teaches a system in which large pipes, sleeves and pistons are planted in the wave zone of the ocean floor.

U.S. Pat. No. 6,700,217 issued Mar. 2, 2004 North et al. is another example of the type of system which requires a great deal of equipment be placed on the ocean floor, in this case pressure sensitive devices.

U.S. Pat. No. 6,647,716 issued Nov. 18, 2003 to Boyd teaches a network of devices floating in the wave zone of the ocean equipped with floats, rams, and other equipment.

U.S. Pat. No. 6,133,644 issued Oct. 17, 2000 to Smith et al. teaches a floating paddlewheel device located off shore.

U.S. Pat. No. 5,789,826 issued Aug. 4, 1998 to Kumbatovic teaches a crane located on a fixed point on shore and holding a large conveyor belt paddlewheel arrangement into surf, while U.S. Pat. No. 5,311,064 issued May 10, 1994 to the same inventor teaches a simpler paddlewheel arrangement and a larger, two legged crane.

U.S. Pat. No. 5,359,229 issued Oct. 25, 1994 to Youngblood teaches a massively plural array of floats with counterweights, anchored off shore.

U.S. Pat. No. 4,781,023 issued Nov. 1, 1988 to Gordon teaches a raft and a fixed mooring: relative motion of the raft, anchored off shore, allows energy generation.

U.S. Pat. No. 4,718,231 issued Jan. 12, 1988 to Vides teaches a large piece of civil engineering with multiple floats and support arms.

U.S. Pat. No. 4,672,222 issued Jun. 9, 1987 to Ames teaches a multiplicity of tripod energy absorbers placed well off shore in a wave zone.

U.S. Pat. No. 4,345,434 issued Aug. 24, 1982 to Nedyalkov teaches a group of containers which are anchored well off shore and motion of water between the containers provides power.

A few systems at least attempt to teach less complex methods and apparatus.

U.S. Pat. No. 6,711,897 issued Mar. 30, 2004 to Lee at least teaches a relatively low cost system having no requirement for ocean floor equipment, but requires either extended float arms capable of reaching distance from the shoreline, or else requires a pier or dock in the wave zone, as shown in the diagrams of the patent.

U.S. Pat. No. 6,247,308 issued Jun. 19, 2001 to Solell teaches a plurality of floats hooked to a single rotary shaft, but the floats appear to float freely in an off-shore location.

U.S. Pat. No. 5,105,094 issued Apr. 14, 1992 to Parker teaches a device of large scale having a large pipeline off shore, with multiple water inlet positions feeding a single piston located closer to shore.

One disadvantage of most of these schemes is that they require that large items of machinery work properly in the marine environment (under ocean water) for many cycles of use. But the prior art schemes of putting equipment on the sea bed have disadvantages. For example, the underwater environment is an extremely arduous environment in a number of ways. Sea water, which contains various minerals and their salts, is corrosive by itself. The ocean is continuously in motion, and particularly during storms, even the largest equipment can be destroyed by the enormous forces generated by masses of water in motion. Sea life tends to grow onto and encrust any man-made object left under water for very long. Generally, it would be advantageous if the energy generation machinery could be place *on land*, rather than in the ocean surf, and yet still generate energy from ocean waves.

None of these devices teaches that the land itself may be a part of the power generation structure. None of these devices teach equipment which may be manufactured on-site or in local areas lacking a "high tech" industrial base. None teach pneumatic methods of transducing wave motion into electrical energy. These devices are sophisticated, expensive, high maintenance apparatus, which require highly trained specialists to operate.

It would be preferable to provide low maintenance apparatus which may convert ocean wave energy to electrical energy.

It would be preferable to provide apparatus which does not require highly trained specialists to operate.

It would be preferable to provide low cost, easy to manufacture methods which may be susceptible to local production by relatively simple methods.

It would further be preferable to provide a structure using the coastline configuration itself to generate electrical energy.

SUMMARY OF THE INVENTION

General Summary

A land based wave motion generator has a bore hole drilled into the bedrock at a coastline of an ocean. The bore hole has a lower end which communicates with the ocean underwater while the upper end is above water level, allowing wave motion within the bore hole. A wave race between the bore hole and the ocean may allow simple access of water pressure from waves to the water in the bore hole, or the wave race may actively concentrate the waves so as to produce a notably larger vertical rise and fall in the sea level within the bore hole.

A pneumatic device such as a bellows atop the bore hole or a float disposed within the bore hole may travel along the borehole between at least two positions: one position corresponding to lower water level between waves and a second position of higher water level at wave crests. A linkage attached to the float converts the motion of the float to rotary motion of a generator shaft so as to induce electric current in the generator. The linkage may be pneumatic, in which the float motion induces pressurized air to drive a turbine, or it may be a rocker arm and chain drive, or a shaft drive, and so on.

Summary in Reference to Claims

It is therefore a first aspect, advantage, objective and embodiment of the present invention to provide a wave energy generator for use at an ocean, sea, lake or other coastline having an average water level and wave action, the wave energy generator comprising:

a bore hole located at such coastline, the bore hole having an open lower end communicating with such ocean at a level under water and an upper end located above such ocean water level;

a float/bellows disposed within the bore hole, the float/bellows having a first lower position and a second higher position, the float/bellows free to travel within the bore hole between the first and second positions as a result of wave action, an electrical generator having a shaft arranged so that rotation of the shaft induces electrical energy in the generator; and a linkage in physical engagement to the float, the linkage causing rotation of the generator shaft in response to reciprocal motion of the float/bellows.

It is therefore a second aspect, advantage, objective and embodiment of the present invention to provide a wave energy generator further comprising:

a flywheel disposed upon the shaft.

It is therefore another aspect, advantage, objective and embodiment of the present invention to provide a wave energy generator further comprising:

a bore hole wall; and a seal applied to the bore hole.

It is therefore another aspect, advantage, objective and embodiment of the present invention to provide a wave energy generator wherein the linkage further comprises:

a crankshaft attached to the shaft and having a vertical rod connecting the crankshaft to the float.

It is therefore another aspect, advantage, objective and embodiment of the present invention to provide a wave energy generator wherein the linkage further comprises:

a chain attached to the float and moving with the float; and at least one cog wheel engaged to the chain, the cog wheel attached to the shaft, whereby motion of the float causes motion of the shaft.

It is therefore another aspect, advantage, objective and embodiment of the present invention to provide a wave energy generator wherein the linkage further comprises:

at least a second cog wheel engaged to the chain, the second cog wheel attached to the shaft, whereby motion of the float causes motion of the shaft.

It is therefore another aspect, advantage, objective and embodiment of the present invention to provide a wave energy generator wherein the cog wheels further comprise:

ratchet mechanisms allowing the first cog wheel to freely rotate in a first direction and the second cog wheel to freely rotate in a second direction, whereby the motion of the shaft will be driven in a first direction of rotation regardless of which direction the float is moving.

It is therefore another aspect, advantage, objective and embodiment of the present invention to provide a wave energy generator further comprising:

a safety screen disposed near the open lower end of the bore hole, so as to prevent ingestion of objects from the body of water into the bore hole.

It is therefore another aspect, advantage, objective and embodiment of the present invention to provide a wave energy generator comprising:

a bore hole located at such coastline, the bore hole having an open lower end communicating with such water at a level under such water and an upper end located above such water level;

a bellows disposed at the bore hole, the bellows having a first lower position and a second higher position, the bellows free to travel between the first and second positions as a result of such wave action, an electrical generator having a shaft arranged so that rotation of the shaft induces electrical energy in the generator; and a linkage in physical engagement to the bellows, the linkage causing rotation of the generator shaft in response to motion of the bellows.

It is therefore another aspect, advantage, objective and embodiment of the present invention to provide a wave energy generator further comprising:

a flywheel disposed upon the shaft.

It is therefore another aspect, advantage, objective and embodiment of the present invention to provide a wave energy generator further comprising:

a bore hole wall; and a seal applied to the bore hole.

It is therefore another aspect, advantage, objective and embodiment of the present invention to provide a wave energy generator wherein the linkage further comprises:

a crankshaft attached to the shaft and having a vertical rod connecting the crankshaft to the bellows.

It is therefore another aspect, advantage, objective and embodiment of the present invention to provide a wave energy generator wherein the linkage further comprises:

a chain attached to the float and moving with the float; and at least one cog wheel engaged to the chain, the cog wheel attached to the shaft, whereby motion of the bellows causes motion of the shaft.

It is therefore another aspect, advantage, objective and embodiment of the present invention to provide a wave energy generator wherein the linkage further comprises:

at least a second cog wheel engaged to the chain, the second cog wheel attached to the shaft, whereby motion of the bellows causes motion of the shaft.

It is therefore another aspect, advantage, objective and embodiment of the present invention to provide a wave energy generator wherein the cog wheels further comprise:

ratchet mechanisms allowing the first cog wheel to freely rotate in a first direction and the second cog wheel to freely rotate in a second direction, whereby the motion of the shaft will be driven in a first direction of rotation regardless of which direction the bellows is moving.

It is therefore another aspect, advantage, objective and embodiment of the present invention to provide a wave energy generator further comprising:

a safety screen disposed near the open lower end of the bore hole, so as to prevent ingestion of objects from the body of water into the bore hole.

BRIEF DESCRIPTION OF THE DRAWINGS

FIG. 3 B is a partial perspective side view of the first preferred embodiment of the ratchet and chain reciprocal to rotary motion converter of the invention.

INDEX TO THE REFERENCE NUMERALS

| | |
|---|---|
| Wave energy generator | 100 |
| Coast | 102 |
| Bore | 104 |
| Bore lining | 105 |
| Coast substrate | 106 |
| Shelter | 108 |
| Ocean | 110 |
| Float piston | 112 |
| Flywheel | 118 |

-continued

| | |
|---|---|
| Electrical generator | 120 |
| Reciprocal/rotary motion converter | 136 |
| Bellows | 150 |
| Air conduit | 152 |
| Valve | 154 |
| Compressed air reservoir | 156 |
| Turbine | 160 |
| Rocker arm | 180 |
| Pivot | 182 |
| Wave energy generator | 200 |
| Coastline | 202 |
| Bedrock | 206 |
| Building | 208 |
| Waves | 210 |
| Flywheel | 218 |
| Generator | 220 |
| Bore spacer | 232 |
| Cross brace | 234 |
| Reciprocal/rotary motion converter | 236 |
| First chain | 362 |
| Second chain | 364 |
| First sprocket/cogwheel | 366 |
| Shaft | 368 |
| Tooth | 370 |
| Second sprocket/cogwheel | 372 |
| Wave energy facility | 400 |
| Coast | 402 |
| Bore | 404 |
| Substrate | 406 |
| Shelter | 408 |
| Large body of water | 410 |
| Float | 412 |
| Rod | 414 |
| Elongated shaft | 416 |
| Flywheel | 418 |
| Generator | 420 |
| Safety barrier | 422 |
| Bore diameter | 424 |
| Throw | 426 |
| Wave energy generator | 500 |
| Bore | 504 |
| Substrate | 506 |
| Float | 512 |
| Piston arm | 514 |
| Elongated shaft | 516 |
| Generator | 520 |
| Bore diameter | 524 |
| Wave race | 530 |
| Flywheel | 618 |
| Bore spacer | 632 |
| Reciprocal/rotary motion converter | 636 |
| Rocker arm | 680 |
| Reciprocal/rotary motion converter | 736 |
| Piston arm | 780 |
| Converter race | 782 |

DETAILED DESCRIPTION

FIG. 8 is a diagrammatic map showing major population centers of the Western United States of America. Major population centers have tended to cluster along coast-lines in all historical eras and locations, and this trend has not changed significantly in the last few decades. Not only is ¾ of the urban population of the Western United States found in coastal urban areas as opposed to inland urban areas, but the same trend holds true for the entire United States. For example, excluding Alaska, approximately 400 coastal counties comprise approximately 11% of the US land area. But those 400 coastal counties contain over one half of the population of the United States of America.

FIG. 9 is a chart showing percentage of population living along a coast-line, with bars for the sum of the world population, the population of the United States of America, and the population of Latin America and the Caribbean Region. It may be seen that the population of Central America and the Caribbean Basin is actually even more concentrated near coast-lines than that of the United States: in fact, 75% of the population of the region is near a coast. Latin America is a particularly apt location for energy generation by wave energy for this reason, but there are other reasons why Latin America would be well suited to the device of the invention as well. In particular, the device of the invention relies upon proven and relatively "middle-tech" or even "low-tech" machinery to generate electricity, thus minimizing the need for expensive imported equipment. This is in contrast to photovoltaic cells, for example, which are difficult and expensive to manufacture, or fossil fired plants which require a continuous import of petroleum, gas, or coal products.

FIG. 10 is a rough chart of the percentage of energy generation used to make electricity in the United States over the last two generations and estimated growth for several years into the near future. It will be appreciated that this chart is not showing the gross growth in electrical energy generation, rather, it shows the growth in electrical energy generation as a percentage of *all* energy generation, and the dramatic growth of electricity supply and demand. If the fact that overall growth in energy generation has increased is factored in, the increase may be considered to be even more dramatic.

Figure 1A:
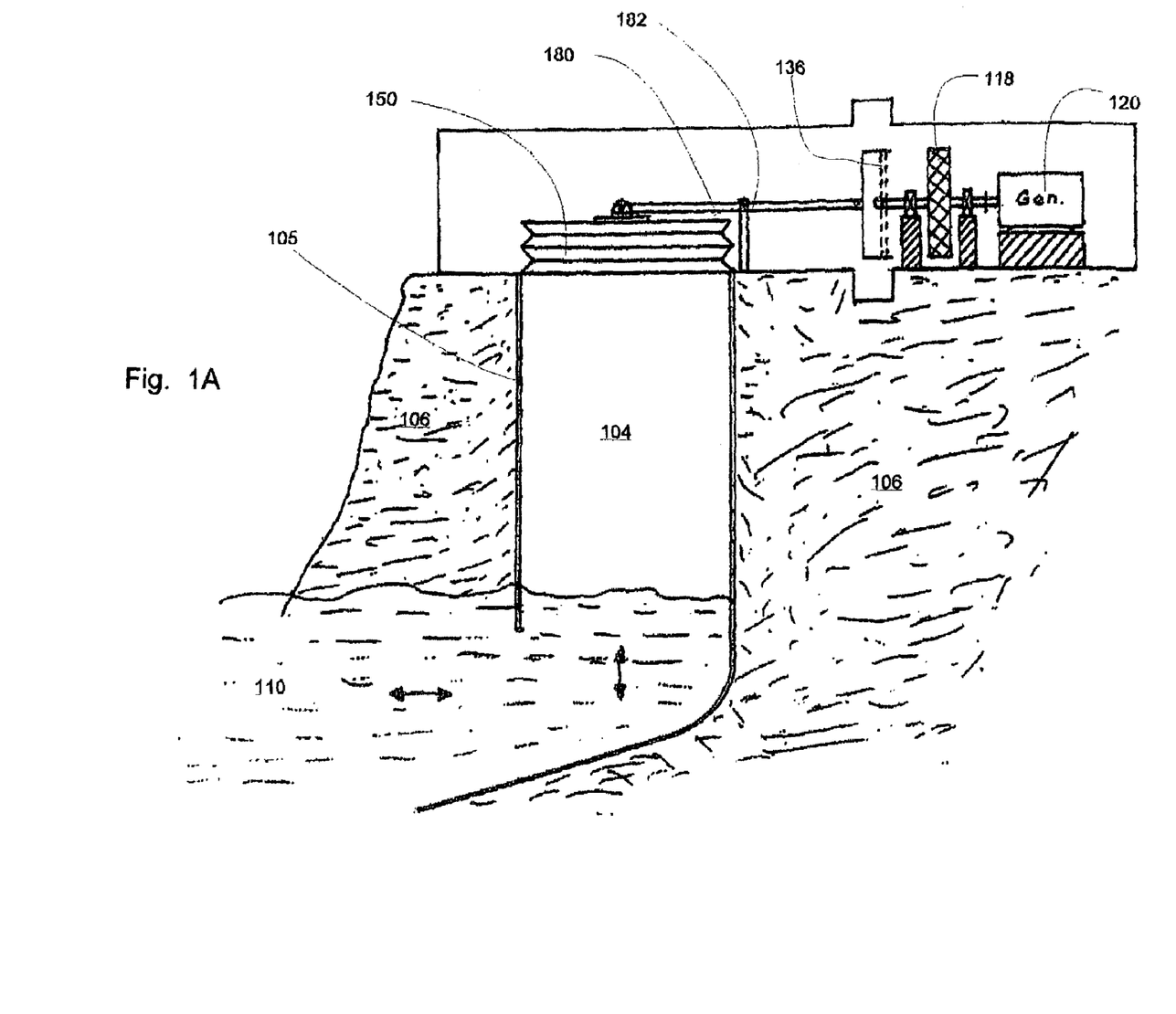
FIG. 1A is a partially cross-sectional side view of a first preferred embodiment of the invention utilizing a lined bore, bellows, rocker arm, ratchet and chain motion converter, and flywheel.

In the presently preferred embodiment and best mode presently contemplated for carrying out the invention, a bellows is used to gather air pressure from a lined bore driven through bedrock of a coastline, as shown in FIG. 1A, which is a partially cross-sectional side view of the preferred embodiment of the invention utilizing the lined bore and bellows and a rocker arm, ratchet and chain motion converter, and a flywheel for rotary motion control.

Wave energy generator 100 is a large facility located on a coastline 102 where wave motion in a large body of water may be present, such as ocean 110 or a large lake or the like. The body of water 110 will have an average water level and various other statistical measures of water level, as well as the wave action. Bore 104 may be drilled into the coastal substrate 106, down to a location where it may intersect the ocean at a location near or under the sea level. Bore 104 is depicted to be vertical and straight but it is worth understanding that the invention may function quite well with slanted bores, bores having irregular shapes and sizes and so on. In pneumatic (air driven) embodiments of the invention, the shape of the bore may be any of a wide range of sizes and shapes, while in float embodiments of the invention, the bore may be any convenient shape which cooperates with a float in the bore and allows the float to move under wave action.

Bore lining 105 may be necessary in pneumatic embodiments to prevent air leakage from the bore, depending upon the quality of the material of substrate 106: some types of rock are stronger and more air tight than concrete, other types of rock and softer materials may require a lining such as bore lining 105. Bore lining 105 may be concrete, metal, polymer, or other materials as desired and practical.

Shelter 108 may be a cavern, structure or building merely small enough to hold only a single generator (possibly even too small for human entry) up to a very large building housing multiple bores and multiple generators. Shelter 108 may also be entirely disposed off if weather resistant equipment is used.

Reciprocal/rotary motion converter 136 is important to the invention. Electrical generators such as electrical generator 120 may generally be operated by rotation of a generator shaft, while wave energy is generally irregular and reciprocal: the waves go up and down. In the preferred embodiment of the invention and the best mode which the inventor presently contemplates, a bellows 150 is secured in an air-tight manner to the top of the air-tight bore 104 or bore lining 105 if present. As water moves in and out of the shaft, it will cause displacement and/or pressurization of the air within the bore 104, which in turn will move bellows 150.

Rocker arm 180 may be secured to the top of bellows 150 and hinged around pivot 182 so the arm may move in a desired plane of motion. Reciprocal/rotary motion converter 136 will then convert the reciprocal motion to rotary motion, in a manner discussed below in reference to FIGS. 3A and 3B.

Flywheel 118 may be disposed upon the generator shaft. In the present application, it is believed that flywheel 118 may provide smoother motion and more continuous motion to the generator shaft, by evening out forces applied to the shaft by the motion converter 136: reducing peak rotational forces (when the wave motion is quite violent) and increasing or providing weak rotational forces (when wave motion is slow) via angular momentum of the flywheel's own mass.

Figure 1B:
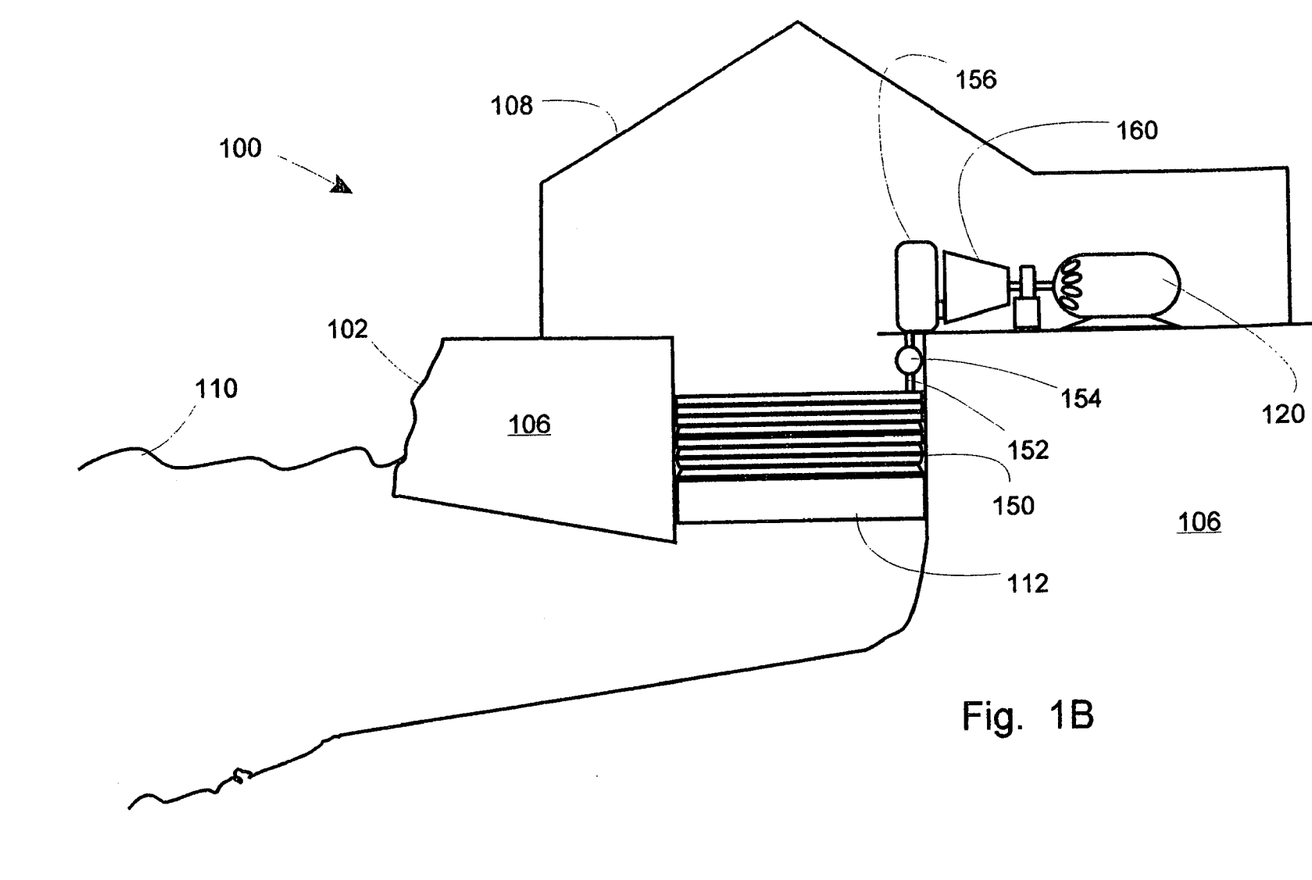
FIG. 1B is a partially cross-sectional side view of an alternative second embodiment of the invention using a bellows, air reservoir, and a turbine.

FIG. 1B is a partially cross-sectional side view of an alternative second embodiment of the invention using a bellows, air reservoir, and a turbine. Wave energy generator 100 is situated on coast 102 and has been provided with bore 104 by means of drilling, blasting, mining, construction or even backfilling and the creation of an artificial coast. Coast substrate 106 has shelter 108 (if necessary) atop it. Ocean/ waves 110 may freely enter the bore 104 and thus raise and lower float piston 112 between first and second positions.

In this alternative embodiment, bellows 150 connects to air conduit 152 which may have valve 154 therein, and may connect to compressed air reservoir 156 which in turn feeds compressed air to turbine 160. In this embodiment, the flywheel may be omitted as the use of compressed air reservoir 156 may allow an even flow of air to the turbine and thus an even rotation of the shaft. Electrical generator 120 may also be a type which operates well despite variations in the speed of rotation of the shaft.

The embodiments of FIGS. 1A and 1B may of course be equipped with double bellows or double valve arrangements so that both the "up stroke" as a wave comes in and the "downstroke" as a wave goes out may provide additional air pressure to the device. The chain and sprocket converter of FIGS. 3A and 3B however provides both up and down stroke power by itself, without the use of additional bellows.

Figure 3A:
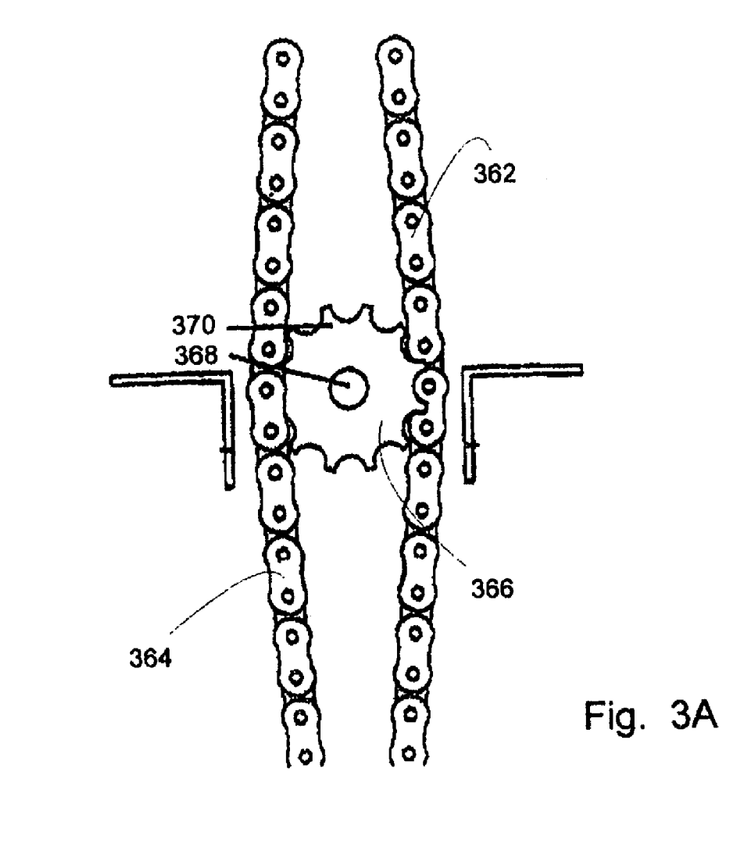
FIG. 3A is a partial side view of a first preferred embodiment of the ratchet and chain reciprocal to rotary motion converter of the invention.
Figure 3B:
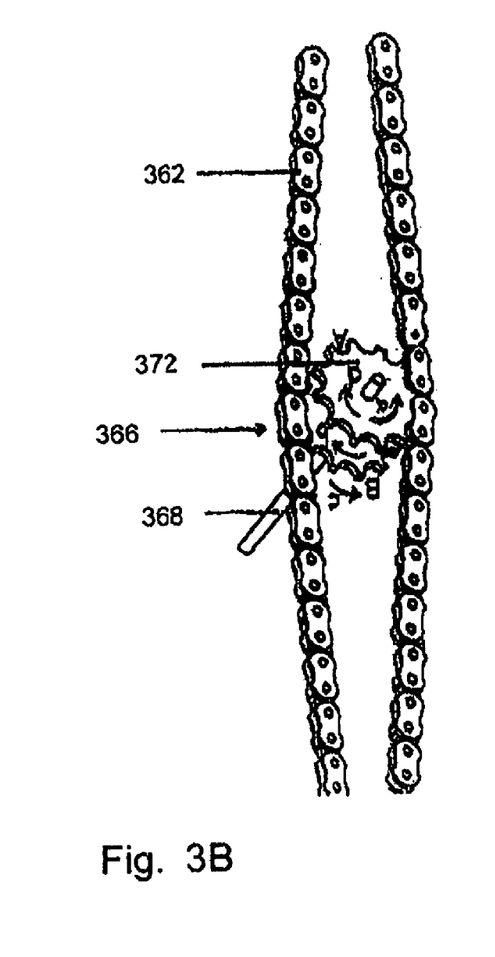

FIG. 3A is a partial side view of a first preferred embodiment of the ratchet and chain reciprocal to rotary motion converter of the invention, while FIG. 3B is a partial perspective side view of the first preferred embodiment of the ratchet and chain reciprocal to rotary motion converter of the invention.

First chain 362 and second chain 364 may engage to two cogwheels: first cogwheel 366, and second cogwheel 372 coaxially mounted on shaft 368. Tooth 370 may move in engagement with the chain as it moves. The cogwheels/ sprockets may be ratcheted for single direction of rotation driven motion, with motion in the opposite direction of rotation being freewheeling. With the sprockets mounted for opposite directions of drive, the result is that on both the up stroke of the cycle (as a wave comes in) and the downstroke (as the wave departs) one chain or the other will drive one sprocket or the other, and the axle (shaft 368) will be rotated under both circumstances, providing a substantially power gain to the shaft and thus to the electrical generator.

Float embodiments of the invention are also possible, in which the bellows is replaced by a float mechanism within the bore, and the motion of the float drives the generator. At the present time, pneumatic embodiments are preferred over mechanical embodiments.

Figure 2:
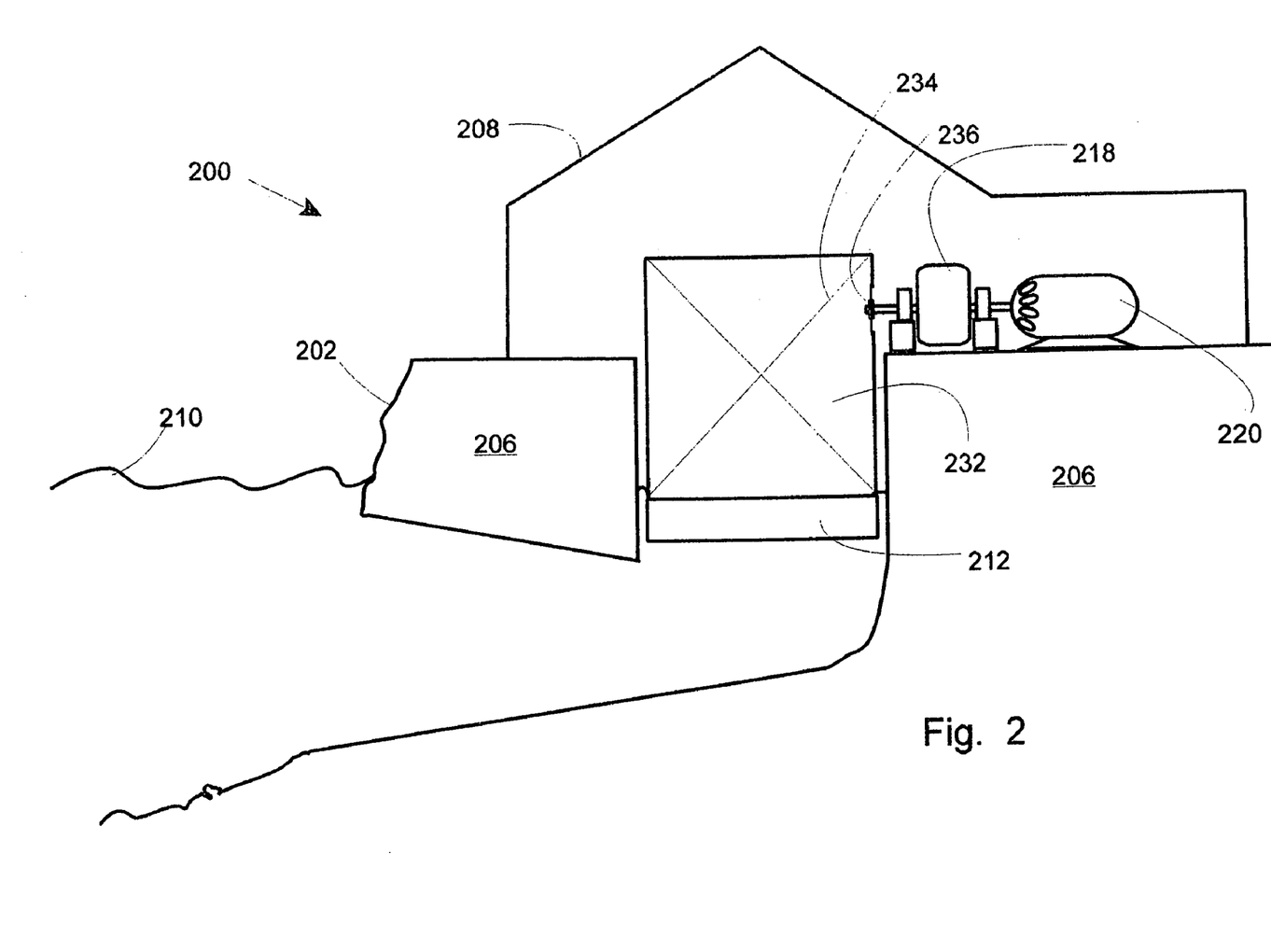
FIG. 2 is a partially cross-sectional side view of an alternative third embodiment of the invention using a ratchet and chain, and a flywheel.

FIG. 2 is a partially cross-sectional side view of an alternative "float" third embodiment of the invention using a ratchet and chain, and a flywheel.

Wave energy electricity generation facility 200 may be located on coastline 202 as previously described. Bedrock 206 may in some instances serve as an ideal substrate through which the bore is driven. Building 208, waves 210, reciprocal/rotary motion converter 236, and flywheel 218 as well as generator 220 may also be as previously discussed.

Bore spacer 232 having cross brace 234 may be used with this "float" embodiment to provide a filled in space within the bore. Reciprocal/rotary motion converter 236 may be part of the space 232 and may carry upon it the chain and sprocket mechanism of the converter discussed in reference to FIGS. 3A and 3B.

Figure 4:
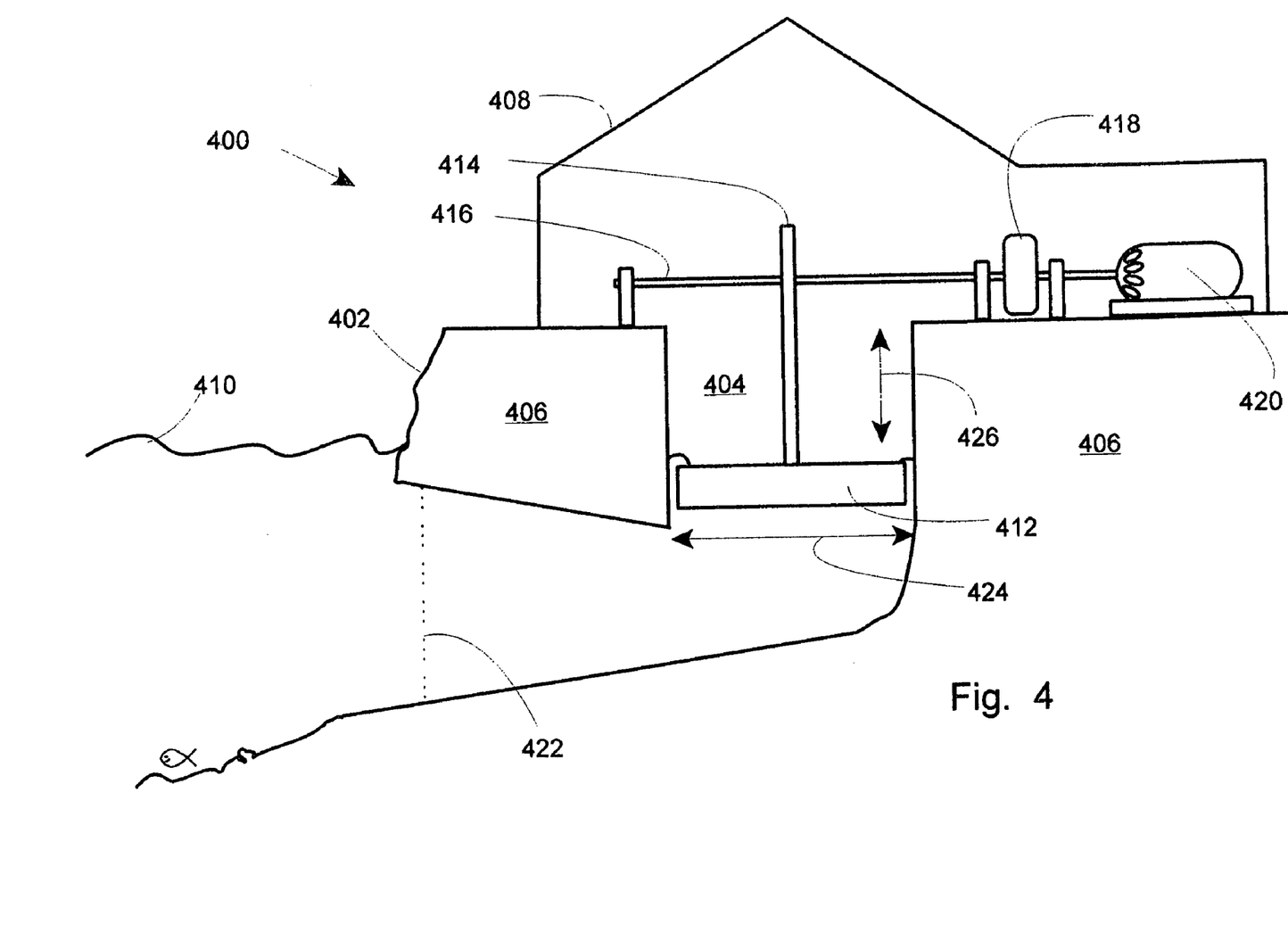
FIG. 4 is a partially cross-sectional side view of an alternative fourth embodiment of the invention using a ratcheted piston rod, elongated shaft, and flywheel.

FIG. 4 is a partially cross-sectional side view of an alternative fourth embodiment of the invention using a ratcheted piston rod, elongated shaft, and flywheel. Wave energy facility 400 on coast 402 has bore 404 through substrate 406 covered by shelter 408.

Motions of large body of water 410 may move float 412 between two or more positions, which in turn moves rod 414, which may have a worm drive or cog drive to elongated shaft 416 bearing flywheel 418 and providing mechanical power to generator 420.

Such an elongated shaft 416 may be less preferable, due to weight, momentum and power restrictions.

Safety barrier 422 may be provided across the wave race or bore so as to prevent accidental or deliberate ingestion of human beings or wildlife into the mechanism. In embodiments, the bore diameter may be quite large.

Bore diameter 424 and throw 426 may vary considerably. Thus extremely small shafts and throws of inches in diameter/length may be used, while in other embodiments extremely large bores and long piston throw distances may be used. It will be appreciated that the bore diameter and throw will vary depending upon the embodiment selected, but also upon local conditions (mean and median wave height, hurricane wave heights, power requirements, generator size, power desired and so on). For example, the preferred embodiment (FIG. 1A) uses a bellows which could easily fit over a multiplicity of small shafts/bores instead of a single large bore. Drilling multiple small shafts might be more easily accomplished.

One presently contemplated embodiment may have a bore diameter of approximately 20 feet (~6.1 m.) while another may have a bore diameter of approximately 40 feet (~12.2 m.), and other diameters down to inches/centimeters in diameter and larger bores as practicable.

Figure 5:
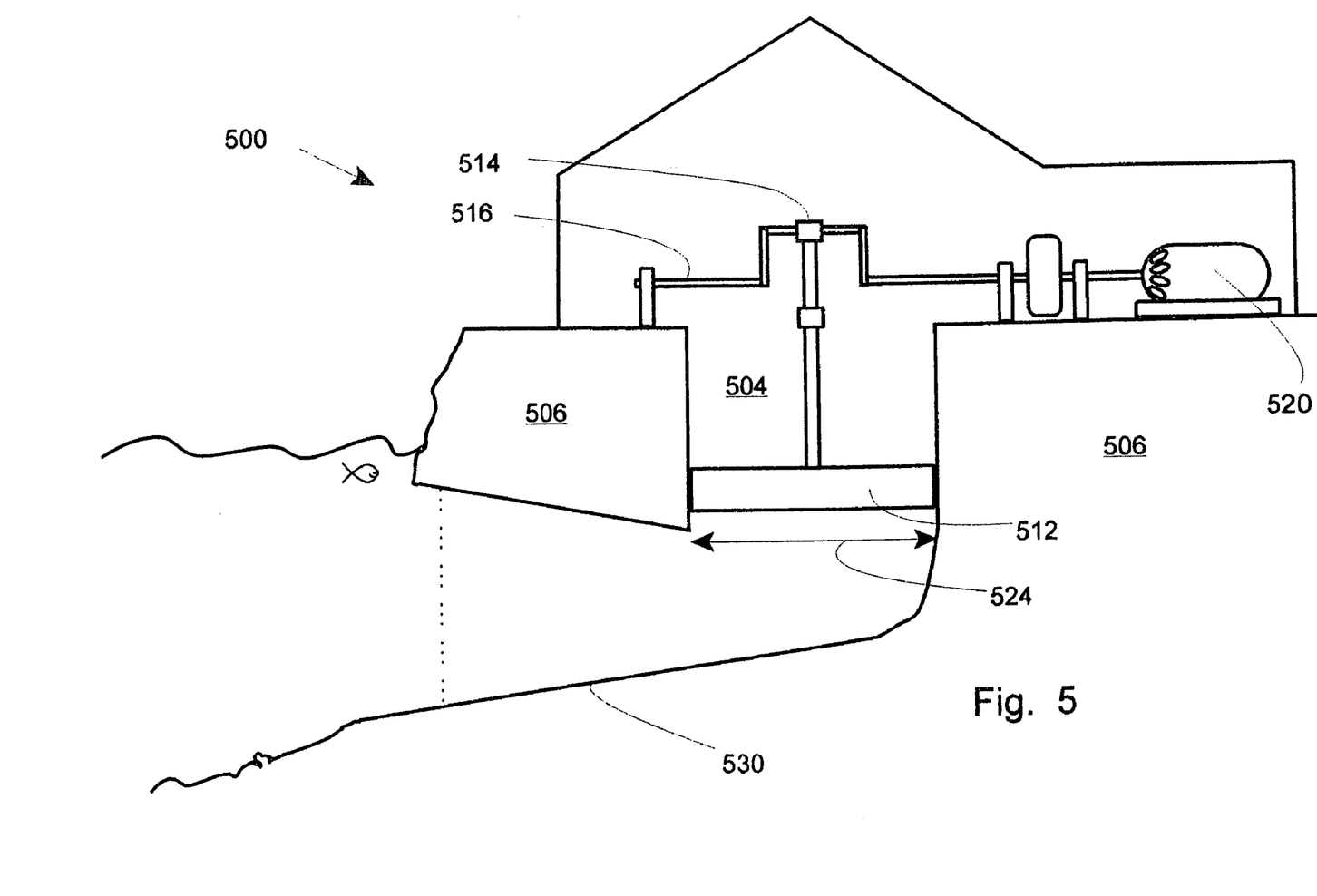
FIG. 5 is a partially cross-sectional side view of an alternative fifth embodiment of the invention using a piston arm, elongated shaft, and flywheel.

FIG. 5 is a partially cross-sectional side view of an alternative fifth embodiment of the invention using a piston arm, elongated shaft, and flywheel.

Wave energy generator 500 has bore 504 through substrate 506, within which is disposed float 512 supported and supporting piston arm 514 which connects to elongated shaft 516 operating generator 520.

Bore diameter 524 may be seen again. As noted earlier, the bore need not be a regular configuration, and thus bore may be measured by bore area rather than diameter depending on bore shape. Wave race 530 may act to "funnel" waves into a narrow area, concentrating the water pressure and motion into a smaller area and thus ensuring a larger "throw" for the piston or bellows and thus more available power per stroke.

Figure 6:
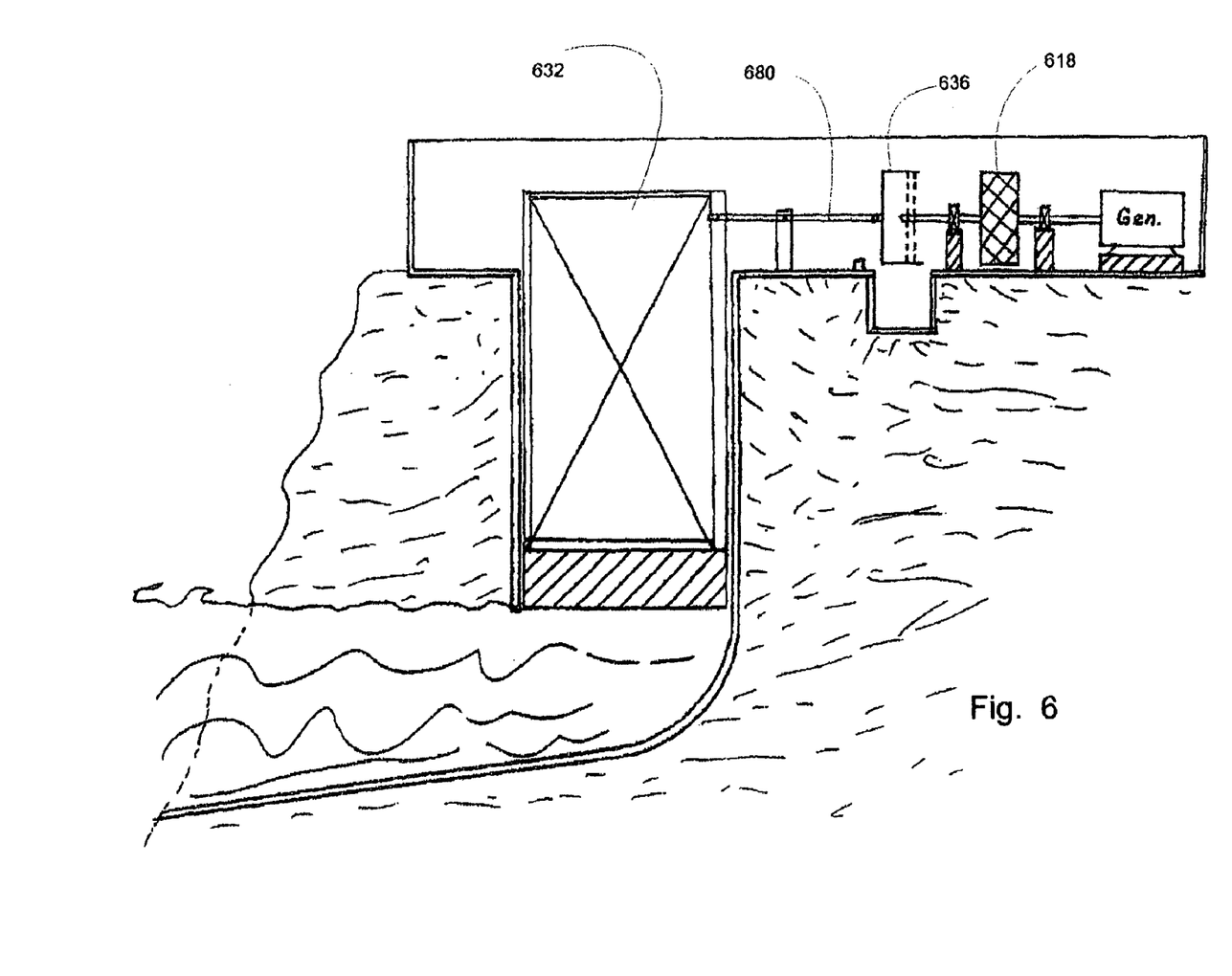
FIG. 6 is a partially cross-sectional side view of an alternative sixth embodiment of the invention using a lined shaft, spacer float, rocker arm, and flywheel.

FIG. 6 is a partially cross-sectional side view of an alternative sixth embodiment of the invention using a lined shaft, spacer float, rocker arm, and flywheel. Flywheel 618 and bore spacer 632 may be used with reciprocal/rotary motion converter 636 and rocker arm 680, thus eliminating the elongated shaft, which saves material and power.

Figure 7:
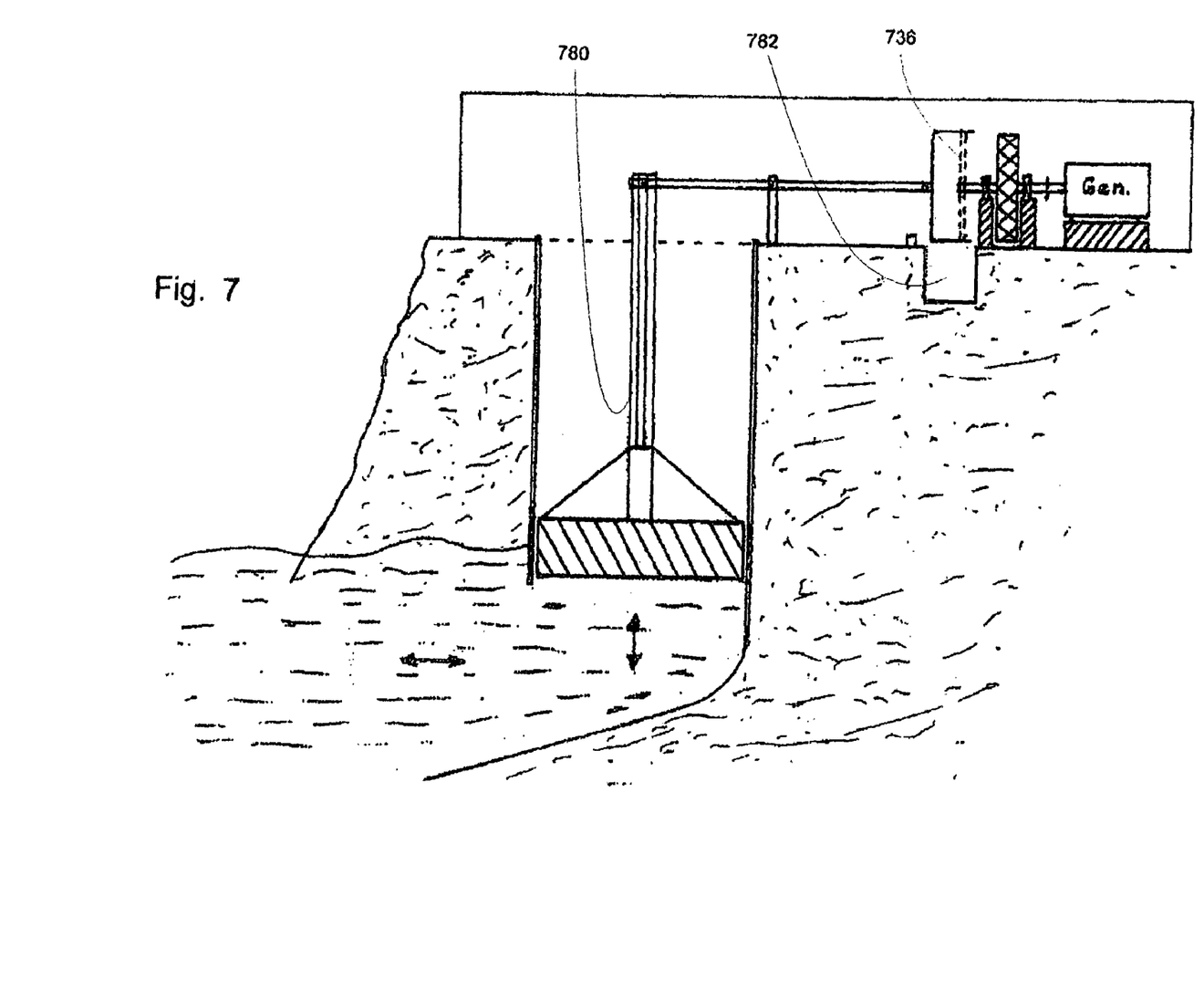
FIG. 7 is a partially cross sectional side view of an alternative seventh embodiment of the invention using a piston, motion converter and a race for the converter.

FIG. 7 is a partially cross sectional side view of an alternative seventh embodiment of the invention using a piston, motion converter and a race for the converter. Reciprocal/rotary motion converter 736 is driven by piston arm 780 in this embodiment.

Converter race 782 may be provided as a trench or depression in the ground to allow the converter 736 to travel fully in conditions of high waves.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the accompanying claims.

I claim:

1. A wave energy generator for use at a coastline of a body of water having a water level and wave action, the wave energy generator comprising:
    a bore hole located at such coastline, the bore hole having an open lower end communicating with such water at a level under such water and an upper end located above such water level;
    a float disposed within the bore hole, the float having a first lower position and a second higher position, the float free to travel within the bore hole between the first and second positions as a result of such wave action,
    an electrical generator having a shaft arranged so that rotation of the shaft induces electrical energy in the generator; and
    a linkage in physical engagement to the float, the linkage causing rotation of the generator shaft in response to motion of the float said linkage further comprises a chain attached to the float and moving with the float and at least one cog wheel engaged to the chain, the cog wheel attached to the shaft, whereby motion of the float causes motion of the shaft.

2. The wave energy generator of claim 1, further comprising:
    a flywheel disposed upon the shaft.

3. The wave energy generator of claim 1, further comprising:
    a bore hole wall; and
    a seal applied to the bore hole.

4. The wave energy generator of claim 1, wherein the linkage further comprises:
    a crankshaft attached to the shaft and having a vertical rod connecting the crankshaft to the float.

5. The wave energy generator of claim 1, wherein the linkage further comprises:
    at least a second cog wheel engaged to the chain, the second cog wheel attached to the shaft, whereby motion of the float causes motion of the shaft.

6. The wave energy generator of claim 5, wherein the cog wheels further comprise:
    ratchet mechanisms allowing the first cog wheel to freely rotate in a first direction and the second cog wheel to freely rotate in a second direction, whereby the motion of the shaft will be driven in a first direction of rotation regardless of which direction the float is moving.

7. The wave energy generator of claim 1, further comprising:
    a safety screen disposed near the open lower end of the bore hole, so as to prevent ingestion of objects from the body of water into the bore hole.

8. A wave energy generator for use at a coastline of a body of water having a water level and wave action, the wave energy generator comprising:
    a bore hole located at such coastline, the bore hole having an open lower end communicating with such water at a level under such water and an upper end located above such water level;
    a bellows disposed at the bore hole, the bellows having a first lower position and a second higher position, the bellows free to travel between the first and second positions as a result of such wave action,
    an electrical generator having a shaft arranged so that rotation of the shaft induces electrical energy in the generator; and
    a linkage in physical engagement to the bellows, the linkage causing rotation of the generator shaft in response to motion of the bellows said linkage further comprises, a chain attached to the float and moving with the float and at least one cog wheel engaged to the chain, the cog wheel attached to the shaft, whereby motion of the float causes motion of the shaft.

9. The wave energy generator of claim 1, further comprising:
    a flywheel disposed upon the shaft.

10. The wave energy generator of claim 1, further comprising:
    a bore hole wall; and
    a seal applied to the bore hole.

11. The wave energy generator of claim 1, wherein the linkage further comprises:
    a crankshaft attached to the shaft and having a vertical rod connecting the crankshaft to the bellows.

12. The wave energy generator of claim 1, wherein the linkage further comprises:
    at least a second cog wheel engaged to the chain, the second cog wheel attached to the shaft, whereby motion of the bellows causes motion of the shaft.

13. The wave energy generator of claim 12, wherein the cog wheels further comprise:
    ratchet mechanisms allowing the first cog wheel to freely rotate in a first direction and the second cog wheel to freely rotate in a second direction, whereby the motion of the shaft will be driven in a first direction of rotation regardless of which direction the bellows is moving.

14. The wave energy generator of claim 1, further comprising:
    a safety screen disposed near the open lower end of the bore hole, so as to prevent ingestion of objects from the body of water into the bore hole.

* * * * *